April 30, 1963

G. B. ALEXANDER ET AL

3,087,234

IRON GROUP METALS HAVING SUBMICRON PARTICLES OF
REFRACTORY OXIDES UNIFORMLY DISPERSED THEREIN

Filed March 14, 1960

20μ  CONTROL—
     NO FILLER

FIG. 2

20μ  METAL FILLED
     WITH THORIA

INVENTORS
GUY B ALEXANDER
WILLIAM H. PASFIELD
PAUL C. YATES

Fred C. Carlson
ATTORNEY

April 30, 1963 G. B. ALEXANDER ET AL 3,087,234
IRON GROUP METALS HAVING SUBMICRON PARTICLES OF
REFRACTORY OXIDES UNIFORMLY DISPERSED THEREIN
Filed March 14, 1960 2 Sheets-Sheet 2

FIG. 3

TRANSVERSE SECTION
20μ

FIG. 4

LONGITUDINAL SECTION
20μ

INVENTORS
GUY B ALEXANDER
WILLIAM H. PASFIELD
PAUL C. YATES

Fred C. Carlson
ATTORNEY 3,087,234
IRON GROUP METALS HAVING SUBMICRON PARTICLES OF REFRACTORY OXIDES UNIFORMLY DISPERSED THEREIN
Guy B. Alexander, Brandywine Hundred, Del., and William H. Pasfield, Sayville, N.Y., assignors to E. I. du Pont de Nemours and Company, Wilmington, Del., a corporation of Delaware
Filed Mar. 14, 1960, Ser. No. 14,734
11 Claims. (Cl. 29—182.5)

This invention is concerned with improving the high-temperature service characteristics of iron, cobalt, and nickel and alloys of these metals with each other and with other metals having an oxide which is stable up to 300° C. and has a free energy of formation ($\Delta F$) at 27° C. of from 30 to 70 kilocalories per gram atom of oxygen (kcal./gm. at. O). The improvement is accomplished by incorporating in the metal very small particles of a refractory metal oxide.

The invention is more particularly directed to products consisting essentially of a uniform dispersion of discrete refractory oxide particles having an average particle size of 5 to 1000 millimicrons, a melting point above 1000° C. and a $\Delta F$ at 1000° C. above 60 kcal./gm. at. O, in a metal of the class to be improved, said metal product having a surface area less than 10 square meters per gram (m.$^2$/g.), and a grain size less than 10 microns, and in a preferred aspect is directed to such metal products having an apparent density which is from 99 to 100% of the absolute density.

Attempts have already been made to incorporate refractory particles into such metals as copper in the hope that such inclusions might impart greater strength to the metals, especially at elevated temperatures. Obtaining an adequate degree of dispersion has been a problem, however, and it has not hitherto been known how to incorporate discrete, very finely divided refractory particles into iron, cobalt, and nickel and their alloys. Unless a complete, homogeneous dispersion is achieved none of the properties of the metal are improved, and some are, in fact, degraded. For this reason oxide occlusions in metals have been viewed with disfavor, and various means, such as scavenging with active metals, have been adopted to get rid of them.

Methods of combining such finely divided powders as aerogels with finely divided metals, using the techniques of powder metallurgy, have been unsuccessful as a way to solve this problem. In such methods the aerogel is mixed with the solid metal, and the whole mass is subjected to very high pressures. Under these circumstances, the ultimate particles in the aerogel structure are forced into intimate contact, producing a densely aggregated structure which cannot be broken down and redispersed when the resulting compact is worked, either hot or cold. Thus, the compositions prepared by this technique consist of metal having very coarse oxide particles dispersed therein, the oxide particles being in the 10 to 100 micron range.

Now according to the present invention, it has become possible to incorporate substantially discrete, 5–1000 millimicron particles in metals of high melting point, the metal being selected from the group consisting of iron, cobalt and nickel and their alloys with each other and with other metals having an oxide which is stable up to 300° C. and has a $\Delta F$ at 27° C. of from 30 to 70 kcal./gm. at. O. In a preferred aspect of the invention, the oxide particles are dispersed in a continuous matrix of the metal, the entire composition having an apparent density which is from 99 to 100% of the absolute density of the metal.

The products of the invention can be prepared by processes in which (a) a compound of the metal to be improved, wherein the metal is in an oxidized state, is precipitated along with substantially discrete particles, having an average dimension of 5 to 1000 millimicrons of a metal-oxygen compound which when heated to constant weight at 1500° C. is a refractory oxide having a melting point above 1000° C. and a $\Delta F$ at 1000° C. above 60 kcal./gm. at. O, (b) thereafter the coating is reduced to the corresponding metal while maintaining a temperature throughout the entire mass below the sintering temperature of the metal, and (c) the reduced product is sintered to a dense mass at a temperature below the melting point of the metal.

THE FILLER

In describing this invention the dispersed refractory particles will sometimes be referred to as "the filler." The word "filler" is not used to mean an inert extender or diluent; rather it means an essential constituent of the novel compositions which contributes new and unexpected properties to the metalliferous product. Hence, the filler is an active ingredient.

In products of this invention, a relatively non-reducible oxide is selected as the filler, that is, an oxide which is not reduced to the corresponding metal by hydrogen, or by the metal in which it is embedded, at temperatures below 900° C. Such fillers have a free energy of formation at 1000° C. of more than 60 kilogram calories per gram atom of oxygen in the oxide. The oxide can be used as a starting material or it can be formed during the process by heating another material as hereinafter described.

The metal-oxygen-containing material from which the filler is derived can, for example, be selected from the group consisting of oxides, carbonates, oxalates, and, in general, compounds which, after heating to constant weight at 1500° C., are refractory metal oxides. The ultimate oxide must have a melting point above 1000° C. A material with a melting point in this range is referred to as "refractory"—that is, difficult to fuse. If the filler particles melt or sinter at lower temperatures, they become aggregated and thereafter do not remain dispersed to the desired degree.

Mixed oxides can be used as fillers, particularly those in which each oxide in the mixed oxide conforms to the melting point and free energy of formation requirements above stated. Thus, magnesium silicate, $MgSiO_3$, is considered as a mixed oxide of MgO and $SiO_2$. Each of these oxides can be used separately; also, their products of reaction with each other are useful. By "dispersion of an oxide" is meant a dispersion containing a single metal oxide or a reaction product obtained by combining two or more metal oxides. Also, two or more separate oxides can be included in the products of the invention. The term "metal oxide filler" broadly includes spinels, such as $MgAl_2O_4$ and $ZnAl_2O_4$, metal carbonates, such as $BaCO_3$, metal aluminates, metal silicates such as magnesium silicate and zircon, metal titanates, metal vanadates, metal chromites, and metal zirconates. With specific reference to silicates, for example, one can use complex structures, such as sodium aluminum silicate, calcium aluminum silicate, calcium magnesium silicate, calcium chromium silicate, and calcium silicate titanate.

Typical single oxides which are useful as the filler include silica, alumina, zirconia, titania, magnesia, hafnia, and the rare earth oxides, including thoria. A typical group of suitable oxides, and their free energies of formation is shown in the following table:

| Oxide: | $\Delta F$ at 1000° C. |
|---|---|
| $Y_2O_3$ | 125 |
| CaO | 122 |
| $La_2O_3$ | 121 |
| BeO | 120 |
| $ThO_2$ | 119 |
| MgO | 112 |
| $UO_2$ | 105 |
| $HfO_2$ | 105 |
| $CeO_2$ | 105 |
| $Al_2O_3$ | 104 |
| $ZrO_2$ | 100 |
| BaO | 97 |
| $ZrSiO_4$ | 95 |
| TiO | 95 |
| $TiO_2$ | 85 |
| $SiO_2$ | 78 |
| $Ta_2O_5$ | 75 |
| $V_2O_3$ | 74 |
| $NbO_2$ | 70 |
| $Cr_2O_3$ | 62 |

The filler oxide must be in a finely divided state. The substantially discrete particles should have an average dimension in the size range from 5 to 1000 millimicrons, an especially preferred range being from 5 to 150 millimicrons, with a minimum of 10 millimicrons being even more preferred.

The particles should be dense and anhydrous for best results, but it will be understood that aggregates of smaller particles can be used, provided that the discrete particles of aggregate are within the abovementioned dimensions. Particles which are substantially spheroidal or cubical in shape are also preferred, although anisotropic particles such as fibers or platelets can be used for special effects. Anisotropic particles produce metal compositions of lower ductility, however, and in those instances where ductility is desired, particles approaching isotropic form are preferred.

When the size of a particle is given in terms of a single figure, this refers to an average dimension. For spherical particles this presents no problem, but with anisotropic particles the size is considered to be one third of the sum of the three particle dimensions. For example, a fiber of asbestos might be 500 millimicrons long but only 10 millimicrons wide and thick. The size of this particle would be $$\frac{500+10+10}{3}$$

or 173 millimicrons, and hence within the limits of this invention.

Colloidal metal oxide aquasols are particularly useful as a means of providing the fillers in the desired finely divided form. Thus, for example, silica aquasols such as those described in Bechtold et al. U.S. Patent 2,574,902, Alexander U.S. Patent 2,750,345, and Rule U.S. Patent 2,577,485 are suitable as starting materials in processes of this invention. Zirconia sols are likewise useful. The art is familiar with titania sols and beryllia and such sols as described by Weiser in Inorganic Colloidal Chemistry, volume 2, "Hydrous Oxides and Hydroxides," for example, can be used to advantage.

Although they are less preferred, aerogels and reticulated powders can also be used. For example, products described in Alexander et al. U.S. Patent 2,731,326 can be employed, but in these instances it is necessary that the aggregate structures be broken down at some point in the process to particles in the size range specified.

Powders prepared by burning metal chlorides, as, for example, by burning silicon tetrachloride, titanium tetrachloride, or zirconium tetrachloride to produce a corresponding oxide, are also very useful if the oxides are obtained primarily as discrete, individual particles, or aggregated structures which can be dispersed to such particles. However, because colloidal metal oxide aquasols already contain particles in the most desirable size range and state of subdivision, these are preferred starting materials for use as a filler.

A particularly preferred filler, for instance, is calcium oxide. Since this oxide is water soluble or, more accurately, water reactive, one cannot obtain aqueous dispersions in the colloidal state with it. In this instance, one can use an insoluble calcium compound, such as the carbonate or oxalate, which, on heating, will decompose to the oxide. Thus, for example, particles of finely divided calcium carbonate can be coated with a hydrous iron oxide by treating a dispersion of finely divided calcium carbonate with ferric nitrate and sodium carbonate. On heating the precipitate and reducing, a dispersion of calcium oxide in iron is obtained. Similarly, one can obtain dispersions of barium oxide, strontium oxide, or magnesia in the metal being treated.

THE METAL

The metal in which a refractory oxide is to be incorporated according to the invention is selected from the group consisting of iron, cobalt, and nickel and alloys of these metals with each other and with metals having an oxide which is stable up to 300° C. and has a free energy of formation at 27° C. of from 30 to 70 kcal./gm. at O. These alloying metals, and the free energies of formation of their oxides are as follows:

| Metal: | $\Delta F$ of oxide at 27° C. |
|---|---|
| Cu | 35 |
| Cd | 55 |
| Tl | 40 |
| Ge | 58 |
| Sn | 60 |
| Pb | 45 |
| Sb | 45 |
| Bi | 40 |
| Mo | 60 |
| W | 60 |
| Re | 45 |
| In | 65 |

COATING THE FILLER

In processes for making the compositions of this invention, a relatively large volume of the metal oxide, hydroxide, hydrous oxide, oxycarbonate, or hydroxycarbonate, or, in general, any compound of the metal wherein the metal is in an oxidized state, is precipitated along with a plurality of the refractory oxide filler particles. This precipitate can contain a compound of single metal, or it can contain two or more metals. For example, the hydrous oxides of both nickel and cobalt can be precipitated together with a filler. In the latter case, an alloy of nickel and cobalt is produced directly, during the reduction step.

In a similar manner, alloys of iron, cobalt or nickel with other metals, which form oxides which can be reduced with hydrogen, can be prepared. Thus, alloys with copper, molybdenum, tungsten, and rhenium can be prepared by codepositing two or more oxides of the selected metals with the filler particles.

To produce such a hydrous, oxygen-containing composition one can precipitate it from a soluble salt, preferably a metal nitrate, although metal chlorides, sulfates, and acetates can be used. Ferric nitrate, cobalt nitrate, and nickel nitrate are among the preferred starting materials.

The precipitation can be conveniently accomplished by adding a suitable soluble metal salt to an aqueous alkaline solution containing the filler particles, while maintaining the pH above 7. A good way to do this is to add, simultaneously but separately, the solution of the soluble metal salt, a colloidal aquasol containing the filler particles, and an alkali such as sodium hydroxide, to a heel of water. Alternatively, a dispersion containing the filler particles can be used as a heel, and the metal salt solution and alkali added simultaneously but separately thereto.

More broadly, in depositing the compound of a metal in an oxidized state upon the filler, one can react any soluble salt of these metals with a basic material. Hydroxides such as NaOH, KOH, or ammonia, or carbonates such as $(NH_4)_2CO_3$, $Na_2CO_3$ or $K_2CO_3$ can be used. Thus, the metal compound deposited can be an oxide, hydroxide, hydrous oxide, oxycarbonate, or in general, a compound which, on heating, will decompose to the oxide.

During the precipitation process certain precautions are preferably observed. It is preferred not to coagulate or gel the colloid. Coagulation and gelation are avoided by working in dilute solutions, or simultaneously adding the filler and the metal salt solution to a heel.

It is preferred that the filler particles be embedded in the reducible oxides or hydrous oxides such as those of iron, cobalt, or nickel, so that when reduction occurs later in the process, aggregation and coalescence of the filler particles is avoided. In other words, it is preferred that the ultimate particles of the filler be not in contact, one with another, in the coprecipitated product. Another condition which is important during the preparation to insure this condition is to use vigorous mixing and agitation.

Having deposited the hydrous oxygen compound of iron, cobalt or nickel on the filler, it is then desirable to remove the salts formed during the reaction, by washing. Ordinarily, one uses an alkali such as sodium hydroxide, potassium hydroxide, lithium hydroxide, ammonium or tetramethylammonium hydroxide in the deposition of the compound. As a result, salts like sodium nitrate, ammonium nitrate or potassium nitrate may be formed. These should be removed, since otherwise they may appear in the final product. One of the advantages of using the nitrate salts in combination with aqueous ammonia is that ammonium nitrate is volatile, and therefore is easily removed from the product. However, the tendency of many metals, such as cobalt and nickel, particularly, to form amine complexes, is a complicating reaction in this case. By carefully controlling the pH during coprecipitation, these side reactions can be avoided.

Having essentially removed the soluble non-volatile salts by washing, the product is then dried at a temperature above 100° C. Alternatively, the product can be dried, and the dry material suspended in water to remove the soluble salts, and thereafter the product redried.

PROPORTIONS OF COATING AND FILLER

The relative amount of oxidized metal compound precipitate which is deposited with the filler particles depends on the end use to which the product is to be put. For example, if the product is to be reduced and compacted directly to a dense mass of filler metal, then from 0.5 to 10 volume percent of filler in the metal composition is a preferred range, and 1 to 5 volume percent is even more preferred. On the other hand, if the product is a masterbatch, to be used, for example, in blending with unmodified metal powder before compaction, then considerably higher volume loadings can be used.

Volume loadings as high as 50%, that is, one volume of oxide for each volume of metal present, can be successfully used, but such products are often pyrophoric. Even heating to 1000° C. after reduction does not completely eliminate this problem. Also, the filler particles in such products tend to coalesce to form large, hard aggregates during the reduction step. This tendency can be reduced by increasing the particle size of the filler, say to 100 millimicrons or even larger. The problems just discussed are minimized as the volume loading is reduced. Alternatively, especially in the range of 40 to 50 volume percent of filler, the modified metal is protected with an inert atmosphere (hydrogen, argon or nitrogen) until it is compacted to a dense mass of metal. At 30 volume percent filler loading, one can usually sinter the modified metal mass sufficiently that it can be handled in air.

Ordinarily, in making products of this invention, relatively large amounts of a hydrous oxygen compound of one of the metals, iron, cobalt or nickel, will be precipitated with relatively small amounts of filler. The amount of precipitated material will vary somewhat with the particle size of the filler, and especially with the surface area thereof. In general, from 0.05 to 30% volume loading of filler in the final metal compositions is desired. However, with smaller filler particles, i.e., those having a surface area greater than $200/D$ m.$^2$/g. (D being the density of the filler in g./ml.), volume loadings of from 0.05 to 5% are preferred. In an especially preferred case, the relative amounts used are such that from 0.1 to 5 volume percent filler will result in the final metal-metal oxide composition after reduction. With relatively large particles—those, for example, in the size range of about 100 millimicrons—one can use volume loadings as high as 20%.

REDUCING THE PRECIPITATE CONTAINING THE FILLER

Having deposited the compound of metal is oxidized state together with the filler particles and washed and dried the product, the next step is to reduce the compound to the metal. This can be conveniently done by subjecting the precipitated mass to a stream of hydrogen at a somewhat elevated temperature. However, the temperature throughout the entire mass must not be allowed to exceed the sintering temperature of the filler particles. One way to avoid premature sintering is to place the product in a furnace at controlled temperature, and add hydrogen gas slowly. Thus, the reduction reaction will not proceed so rapidly that large amounts of heat are liberated and the temperature in the furnace is increased.

Hydrogen to be used in the reduction can be diluted with an inert gas such as nitrogen to reduce the rate of reaction and avoid "hot spots." In this way the heat of reaction will be carried away in the gas stream. Alternatively, the temperature in the furnace can be slowly raised into the range of 500 to 700° C. while maintaining a flow of hydrogen over the product to be reduced.

In addition to, or instead of, hydrogen, carbon monoxide can be used as the reducing agent, particularly at elevated temperatures, as well as methane or other hydrocarbon gases. In any case, it is important that the temperature during reduction be controlled, not only to avoid premature sintering as above-mentioned but also so that excessive reaction will not occur between the reducible compound (such as iron, cobalt or nickel oxide) and the filler oxide before the reducible compound is reduced.

Reduction should be continued until the reducible compound is essentially completely reduced. When the reaction is nearing completion, it is preferred to raise the temperature to the range between 700 and 1300° C. to complete the reduction reaction, but care must be taken not to exceed the melting point of the reduced metal. Reduction should be carried out until the oxygen content of the mass is substantially reduced to zero, exclusive of the oxygen of the oxide filler material. In any case, the oxygen content of the product, exclusive of the oxygen in the filler, should be in the range from 0 to 2%, preferably from 0 to 1%, and still more preferably from 0 to 0.1%, based on the weight of the product.

One way of estimating the oxygen content is to measure the change in weight of a product on treatment with dry, oxygen-free hydrogen at 1300° C. Products which show a change in weight of only from 0.0 to 0.1% under this condition are most preferred.

After the reduction reaction is complete, the resulting powder is sometimes pyrophoric. Therefore, it is preferred to cool the mass in an inert atmosphere, and further compact the mass to reduce surface area in the absence of oxygen, if this is necessary to prevent reoxidation.

SINTERING THE REDUCED PRODUCT

After the precipitate has been reduced to the corresponding metal the product is sintered by heating it to an elevated temperature which is, however, below the melting point of the metal. It will be recognized that when very high temperatures are used during the reduction step, some sintering can occur simultaneously with reduction; however, such temperatures should be reached only after the reduction has proceeded to a considerable degree and preferably is substantially complete.

The sintering insures that the products will not be readily reoxidized in air. It also converts to the corresponding oxides such filler materials as metal carbonates and oxalates.

Sintering of the product is continued until the surface area is lowered below 10, and preferably below 1, square meter per gram. Such products are not pyrophoric and can be handled in air.

It has been observed that the temperature required to obtain the desired degree of sintering varies with the loading of the filler in the metal. In general, the higher the loading, the higher is the sintering temperature required. Also, the smaller the filler particles, the higher the sintering temperature required.

It is important that, during this sintering operation, the melting point of the metal be not exceeded. Actually, it is preferred to maintain the temperature at least 50 centigrade degrees below the melting point.

COMPACTING THE PRODUCT

When the final products of this invention are to be fabricated into dense metal objects, the entire mass of reduced metal and oxide filler is first compacted. This can be done by subjecting the product to very high pressures, at ordinary temperatures, or preferably at temperatures equivalent to about two thirds of the absolute melting point of the metal coating. In some instances, it is desirable to heat the product during this pressing operation to temperatures just slightly below the melting point. Obviously, the compacting can be effected simultaneously with the sintering step.

In order to obtain a strong bond between the particles of the finely divided reduced powder, it may be desired to hot- or cold-work the resulting composition, as, for example, by hot-rolling, -extruding or similar techniques well known in the metallurgical art. However, working in order to improve dispersion is not necessary; by the processes above described, dispersion is obtained directly.

The product preferably is compacted until it has reached at least 99% of theoretical density. Such products are improved not only in strength, but also in oxidation resistance. For instance, the oxidation resistance of the metals iron, cobalt and nickel and alloys in which these metals are the major component can be so much improved that they can be used at 1000° C. without serious oxidation. Thus, the need for alloying with other metals to improve oxidation resistance is eliminated.

ALLOYS

In general, alloys containing a metal of the ferrous group—iron, cobalt, and nickel—with metal oxide particles uniformly dispersed throughout the metal matrix, are products of this invention. Thus, ferrous alloys like nickel steel, high molybdenum steel (e.g., 86% Fe, 14% Mo), nickel molybdenum steel (e.g., 2% Ni, 1% Mo), nickel alloys like monel metal (copper, nickel alloys), the Hastelloy metals (molybdenum, iron, nickel alloys), and iron tungsten alloys, particularly those containing up to 20% tungsten, are important and useful compositions of the invention.

These alloys can be prepared directly, by codepositing hydrous oxides of the metals with the selected oxide filler and reducing with hydrogen. Such a process is particularly useful for alloys of iron and metals below it in the electromotive series of metals. Thus, for example, an alloy containing nickel and copper can be prepared by depositing hydrous nickel oxide and hydrous copper oxide on colloidal thoria filler and reducing. Similarly, alloys of nickel-molybdenum, cobalt-iron-nickel, cobalt-copper, nickel-tungsten, and many others can be so produced. In general, alloys of metals between copper and iron in the E.M.F. series can be prepared in this manner.

Products of this invention thus include not only modified ferrous group metals, but also these metals in combination with each other and with certain other metals. In the latter group are alloys and metal products containing metals whose oxides have a free energy of formation at 27° C. of from 30 to 70 kilocalories per gram atom of oxygen, together with at least one ferrous group metal.

CHARACTERIZATION OF PRODUCTS

It will be understood, of course, that in addition to alloys as above described, products of the invention include the individual metals—iron, cobalt and nickel—modified with the dispersed refractory oxide particles. In the product characterizations which follow, descriptions will sometimes be given with particular reference to such single-metal compositions of the invention, but it will be apparent that characterizations can also be applied to the alloy products.

The filler particles present in the metal grains of products of this invention are uniformly dispersed—that is, the particles are found both at the grain boundary and inside the grain.

This dispersion can be demonstrated, using the electron microscope and replica techniques wherein the surface of a metal piece is polished, etched, a carbon layer is deposited on the polished surface, and the metal is removed, as by dissolving in acid. An electron micrograph of the remaining carbon film shows that the filler particles are uniformly distributed throughout the metal grains. They are not concentrated at the boundaries to such an extent that they appear like beads on a string. Because of this, useful metal parts can be made directly compacting the metal-metal oxide powders as prepared by the invention. This eliminates the necessity of working in order to improve dispersion.

By "uniformly dispersed" is meant that there is uniform distribution of the refractory oxide particles within any single selected microscopic region of treated metal, such regions being about 10 microns in diameter.

The solid metal products of the invention are further characterized in that they are substantially free of fibering of the dispersed refractory oxide. This is a consequence of their novel process of preparation, wherein the oxide filler particles are precipitated homogeneously with an oxygen-containing compound of the metal. Fibering is the result encountered with prior art products wherein agglomerated filler particles are fragmented during working, as by extrusion; the fragments show a definite and easily discernible alignment. Such alignment gives a starting point for crack propagation and ultimately leads to failure of the metal under stress, especially at high temperatures. Its avoidance is a distinct advantage of the novel compositions.

Figure 3:
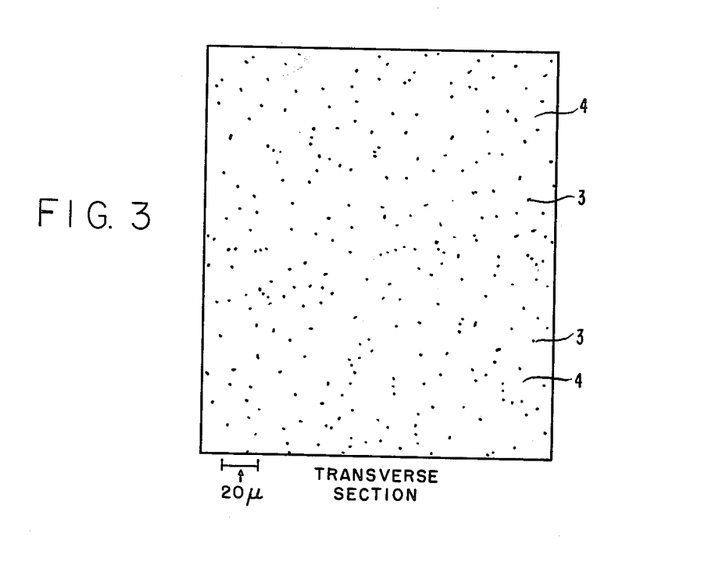
FIGURE 3 is a sketch showing how thoria refractory particles dispersed in nickel appear in a similar photomicrograph when viewed in section transverse to the direction of hot extrusion of the sample.
Figure 4:
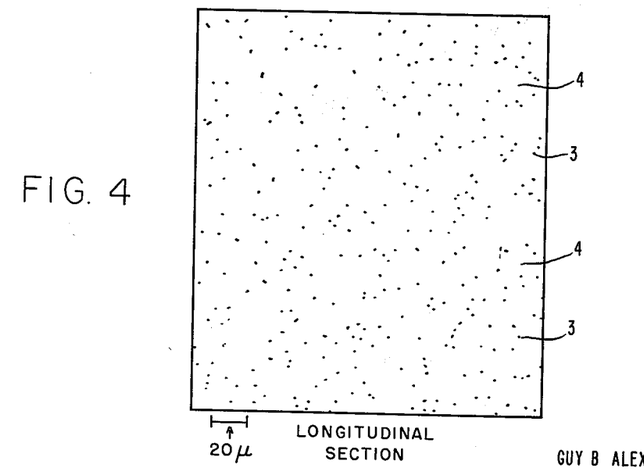
FIGURE 4 is a similar sketch showing the same sample in longitudinal section.

In products of this invention, the filler is not fibered, i.e., is not present in stringers. The filler is uniformly dispersed throughout the metal matrix. For example, if one examines an extruded rod, the distribution of filler in transverse and longitudinal planes is essentially the same. This is illustrated in FIGURES 3 and 4 of the drawings, wherein the dots 3 represent the filler particles, the plain areas 4 within the frame representing the metal.

The filler particles in compositions of the invention must be in the size range below 1000 millimicrons, and should be from 5 to 250 millimicrons. Still more preferably they should be from 10 to 250 millimicrons. The latter class is particularly preferred, since the 10 millimicron particles are considerably more difficult to coagulate or gel, and thus easier to maintain in a dispersed state during the processes of this invention, than smaller particles. Products containing filler particles in the size range of from 10 to 150 millimicrons can be readily produced according to processes of this invention from colloidal aquasols. Although very small particles can be used, these are difficult to handle because they sinter easily when dried and gel easily in liquid phases. Moreover, very small particles are extremely reactive. Five millimicron particles can be used, but 10 millimicron particles are easier to use.

In describing products of this invention an oxide filler particle is defined as a single coherent mass of oxide surrounded by metal and separated from other oxide mass by metal. The particles may be aggregates of smaller ultimate units, which are joined together to form a structure.

The particles of the filler in compositions of the invention are substantially completely surrounded by a metal coating which maintains them separate and discrete. The particles are thus isolated, and do not come in contact one with another; thus, coalescence and sintering of the filler material is inhibited.

Metal compositions in which the filler is thoria, a rare earth oxide, or a mixture of oxides of the rare earth elements of the lanthanum and actinium series, magnesium oxide, or, to a lesser extent, calcium silicate, appear to have exceptional stability in elevated-temperature, long-continued tests such as stress rupture and creep tests. These materials maintain their properties to a considerably greater extent than metals filled with silica, for example, even when the initial hardness obtained during the processing operation is similar. The reason for this improvement appears to be related to the free energy of formation of the filler. For this reason, preferred compositions of the invention for use at very high temperatures, i.e., 800° C. to 1000° C., comprise a dispersion, in a metal, selected from iron, cobalt and nickel, of oxide particles having a size in the range 5 to 250 millimicrons, at volume loadings from 1.0 to 10%, the oxide in the dispersion having a free energy of formation at 27° C., per gram atom of oxygen atom in the oxide, of more than 90 kcal. and preferably more than 110 kcal.

Actually, silica is a highly efficient filler for ferrous metal compositions which do not need to be heated above 600 to 700° C. during processing or use. In the case of iron-molybdenum or nickel-molybdenum alloys, temperatures as high as 1300° C. or slightly higher are often encountered during processing. In these cases, only the very stable oxides are effective as fillers, i.e., those with a very high free energy of formation, such as the rare earth oxides or calcia. (For free energy of formation data, see, for example, Smithell's Metal Reference Book, 2nd edition, volume 2, p. 592, Interscience Publishers, Inc., New York, 1955.)

The compositions of one aspect of the invention comprise a continuous phase of a metal from the group consisting of iron, cobalt, or nickel, containing dispersed therein the non-reducible oxide filler. That the metal is essentially the continuous phase can be demonstrated by compacting the reduced mass, sintering, and measuring conductivity. The conductivity of the metal is essentially unaffected by the presence of the oxide, if the metal is present as a continuous phase. If, on the other hand, the metal is dispersed and the oxide is the continuous phase, conductivity will be drastically reduced.

The metal products of the invention exhibit isotropy in physical characteristics. Thus, if one measures such a property as yield strength in any given direction in a mass of the metal product, one will find that measurement of the strength along an axis at a 90-degree angle to the original given direction will produce a similar value of yield strength, i.e., within 50%.

When prepared directly, the products of the invention are uniform dispersions of filler particles in metals. By uniform is meant that the oxide is distributed essentially homogeneously throughout the metal, and the oxide is present inside the grains as well as at the grain boundaries. Specifically, if one examines an electron micrograph prepared by the carbon replica technique, one will find that the ratio of the concentration of oxide particles along the grains to the concentration of oxide in the samples is less than 10:1 and specifically in the range from 0.1:1 to 10:1. Often, the grains in the compositions of the invention are so small that grain boundaries are difficult to find.

Such a measurement can be made as follows: Prepare a micrograph by the carbon replica method, and select an area typical of grain boundaries. Measure an area along said grain for a distance of 100D, where D is the number average particle size, and 2D wide on either side of the grain, i.e., an area of 400D². Count all the particles in this area; let this number be $N_1$. Measure another representative area 20D on each side, preferably inside a grain, and at a distance at least 2D away from any grain boundary, i.e., an area 400D² which is a square. Count all the particles in this area, $N_2$. $N_1/N_2$ will be in the range of 0.1:1 to 10:1 for products of the invention.

The grain size of the products of this invention is small, even after high-temperature treatment. Thus, the grain size of a preferred composition of the invention, namely, a 2% dispersion of 100 millimicron $ThO_2$ particles in nickel is less than 10 microns, even after annealing at a temperature which is above the recrystallization temperature of the nickel, i.e., annealing at 1200° C. In general, such annealing can be done in vacuum at a temperature in degrees absolute of 0.75 times the melting point of the metal for five hours. The grain size described below is measured after such an annealing treatment.

Grain size can be determined by usual metallurgical procedures of polishing, etching and examination of the etched surface with a light microscope, at a magnification, for example, of 500 times. For smaller grain sizes, i.e., below 5 microns, carbon replicas of the etched surface can be examined with the electron microscope, e.g., at 5000 times.

Some compositions respond to chemical etching, while others are most readily prepared for examination by electrolytic etching or thermal vacuum etching. Such techniques are commonly used in the metals industry, and one skilled in the art will be able to identify grain patterns by techniques which are published in metallurgical literature.

Figure 1:
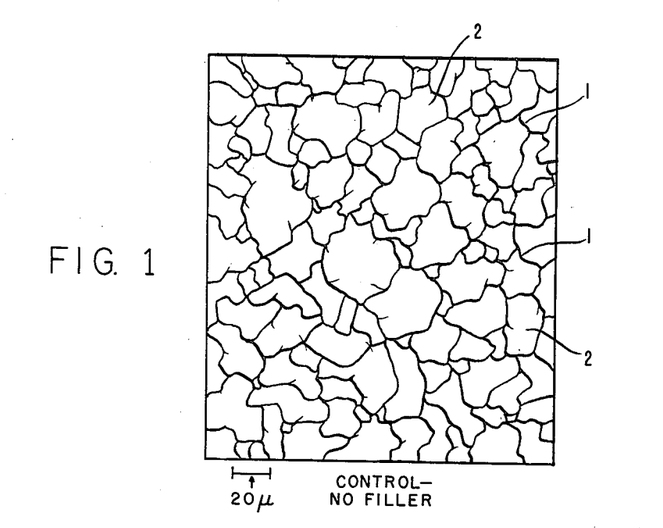
FIGURE 1 is a line drawing prepared from and simulating a photomicrograph of an etched nickel surface at 500 times magnification, showing the grain size of the metal without modification with dispersed refractory.
Figure 2:
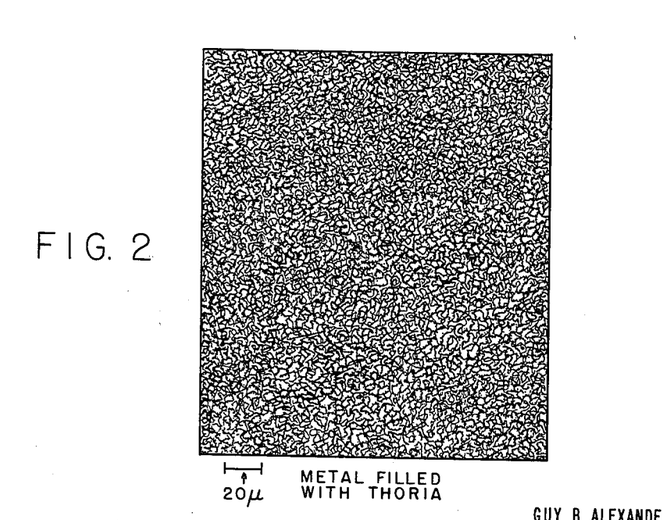
FIGURE 2 is a similar line drawing of nickel modified with dispersed thoria particles.

Referring again to the drawings, FIGURE 1 is a line drawing showing what one sees in such a photomicrograph of an unfilled metal product. The grains 2 are relatively large and are in contact at well-defined grain boundaries 1. In contrast, on a similar photomicrograph of a thoria-filled sample of the same metal the grains are extremely small. In FIGURE 2 the dispersed thoria can be seen, upon close inspection, as small dots in and around the metal grains.

In the products of the invention, substantially all of the grains are smaller than 10 microns in size. It is understood that the grains will vary in size, some being larger than the average and others smaller. In the products of the invention, at least 90% of all the grains are smaller than 10 microns.

Products having an average grain size smaller than 5 microns are preferred, while those having an average size smaller than 2 microns are still more preferred. In general, as grain size decreases, yield strength increases.

Even at a grain size of 10 microns, yield strength at 1800° F. of nickel or nickel alloy products of the invention is at least 6000 p.s.i. better than the corresponding products containing no filler.

Compositions of this invention are especially useful for fabrication into components which must maintain dimensional stability under heavy stress at high temperatures, such as turbine blades.

The invention will be better understood by reference to the following illustrative examples.

*Example 1*

A solution of ferric nitrate was prepared by dissolving 500 grams of ferric nitrate hydrate in water and diluting this to 1 liter. A commercial silica sol, prepared according to Example 3 of Bechtold and Snyder U.S. Patent 2,574,902, containing substantially discrete particles having an average diameter of about 17 millimicrons, having an $SiO_2:Na_2O$ weight ratio of about 90:1, and known as "Ludox" HS, was used as the source of the filler material. A 1.7-gram portion of this colloidal aquasol (30% $SiO_2$) was diluted to 1 liter. To a heel containing 1 liter of water at room temperature the solution of ferric nitrate, the diluted "Ludox" solution, and 5 N ammonium hydroxide were added as separate solutions simultaneously, and at uniform rates while maintaining very vigorous agitation. A coating of ferric hydroxide was thus deposited around the silica particles. The resulting mixture was filtered, and washed to remove the ammonium nitrate. The filter cake was dried in an oven at 110° C. to remove substantially all of the water.

The product obtained was compacted into a porous billet and placed in an oven at a temperature of 450° C. Hydrogen was slowly passed over the billet at such a rate that sufficient hydrogen was added to the ferric oxide to reduce it in a period of four hours. The flow of hydrogen was maintained at a steady, uniform rate during this reduction procedure for eight hours. Thereafter, the temperature was raised to 500° C. while maintaining the flow of pure, dry hydrogen at the same rate, and finally the temperature was raised to 700° C. and the flow of dry hydrogen was increased twenty-fold, to complete the reduction. The resulting product was compressed in a one-inch die at 450° C. and 20 tons per square inch and finally extruded through a die to form a wire, using an area reduction ratio of 10:1.

The iron powder obtained is useful in powder metallurgical applications, for the fabrication of iron parts. Such parts are useful at temperatures below about 600° C.

*Example 2*

A solution of nickel nitrate was prepared by dissolving 4362 grams of nickel nitrate hydrate $Ni(NO_3)_2 \cdot 6H_2O$ in water and diluting this to 5 liters. A thoria sol, stabilized with a trace of nitric acid, containing substantially discrete particles having an average diameter of about 5 to 10 millimicrons, was used as the source of the filler material. A 28.8-gram portion of this colloidal aquasol (26% $ThO_2$) was diluted to 5 liters. To a heel containing 5 liters of water at room temperature, the solution of nickel nitrate, the diluted thoria sol, and ammonium hydroxide-ammonium carbonate solution were added as separate solutions simultaneously, and at uniform rates, while maintaining very vigorous agitation. During the precipitation, the pH in the reactor was maintained at 7.5. A precipitate of nickel hydroxide-carbonate was thus deposited with the thoria particles. The resulting mixture was filtered, and washed to remove the ammonium nitrate. The filter cake was dried in an oven at 300° C.

The product obtained was pulverized with a hammermill to pass 325 mesh, placed in an oven, and heated to a temperature of 500° C. Hydrogen was slowly passed over the powder at such a rate that sufficient hydrogen was added to the nickel oxide to reduce it in a period of four hours. The flow of hydrogen was maintained at a steady, uniform rate during this reduction procedure for eight hours. Thereafter, the temperature was raised to 700° C. and the flow of dry hydrogen was greatly increased, and finally the temperature was raised to 750° C. to complete the reduction. The resulting product was compressed in a one-inch die at 20 tons per square inch, sintered in dry hydrogen by slowly increasing the temperature to 1200° C. over a period of six hours in order to reduce the last traces of nickel oxide and further densify the green compact, machined to three-fourth-inch diameter, and finally extruded through a die to form a rod three-sixteenth-inch diameter.

The resulting nickel, modified with 1 volume percent thoria, is an example of a product of the invention. After annealing at 1200° C., it had a yield strength (0.2% offset), measured at 1500° F., of 15,000 p.s.i.

The yield strength of a nickel specimen made in a similar way, but excluding the thoria, was 2,800 p.s.i. at 1500° F. Thus, the improvement in yield strength at 1500° F. is greater than a factor of 5. The elongation at 1500° F. of the nickel-thoria sample was 10%, whereas it was 14% for unfilled nickel. Thus, the elongation decreased by only 28%.

The grains in the resulting nickel-thoria rod, even after annealing for five hours at 1200° C. in pure argon were about 5 microns in average size.

Electron micrographs were prepared by replica technique of the thoria from the polished surface of this Ni-$ThO_2$ product. It was evident from these micrographs that the thoria was homogeneously distributed in the metal matrix. By this is meant that, if an area of about 10 square microns was examined, and the number of particles in this area determined, then the number of particles in this area is approximately equal (± about 20%) to the number of particles found in an electron micrograph taken of some other area in the sample. The thoria particles were actually inside the metal grain, as well as at the grain boundaries. However, there is no concentration of particles at said grain boundaries.

The electron micrographs were prepared as follows: A three-sixteenth-inch rod of nickel containing dispersed thoria was cut and the cross section was electropolished. The electropolished surface was cleaned and dried in ethyl alcohol. The samples were then placed in a high vacuum evaporator and a vacuum of $10^{-5}$ mm. of Hg was reached. At this time two carbon rods were brought together within the evaporator and current applied until sputtering occurred. A very thin film of carbon was deposited upon the electropolished surface as the sputtering occurred.

The carbon-covered, electropolished surface was scribed into one-sixteenth-inch square with the use of a sharp cutting blade.

Next the sample was placed in a culture dish containing a 2% solution of nitric acid. In a few seconds the carbon squares were freed from the surface of the metal by chemical etching. They floated to the surface of the solution, were picked up on electron microscope screens (250-mesh S/S wire), and viewed in the electron microscope.

The solution of nitric acid was used to remove the carbon because the acid would attack the base metal and not do any damage to the oxide, or the carbon.

All samples were photographed in the electron microscope at a film magnification of 1,250× and 5,000×, respectively. Prints at 5,000× were made from the 1,250× negative and at 20,000× from the 5,000× negative. The presence of thermal etching lines in the 20,000× picture was plainly observable.

Examination of the structure showed that there was no preferred orientation of the thoria in the extrusion direction. Specifically, electron micrographic examination in directions longitudinal and transverse to the extrusion direction were essentially identical in appearance. Thus, one could not determine from an examination of these micrographs which had been the direction of extrusion.

The elevated-temperature strength of the material of this example was many times greater than a comparable sample of nickel containing no thoria. A particularly outstanding aspect of the high-temperature properties of this material was the fact that these properties were almost completely unchanged by exposure at temperatures exceeding 900° C. for periods of time ranging greater than 100 hours. This is in sharp contrast to the instability of precipitation-hardened or age-hardened conventional alloys.

*Example 3*

A procedure similar to that of Example 2 was employed to prepare a composition comprising 3 volume percent of the mixed rare earth oxides in cobalt. The mixed oxides were incorporated into the cobalt in the form of a colloidal aquasol prepared by the reaction of ammonia with the chloride salts.

The source of the mixed rare earth oxide was didymium oxide. The didymium oxide sol was obtained by peptizing calcined didymium oxalate in dilute $HNO_3$. Precipitation, filtration, washing, drying, and reduction were carried out as in Example 1, except that the final reduction temperature was 900° C.

The modified cobalt-didymium oxide powder produced in this example is a product of the invention. The powder consists of cobalt metal particles with a plurality of 100 millimicron rare earth oxide particles dispersed throughout the cobalt. The cobalt powder particles were, on the average, 100 microns in size. The powder had a surface area of less than $0.1$ m.$^2$/g. and an oxygen content, exclusive of the rare earth oxides, of 0.15%. It was a non-pyrophoric mass, i.e., on exposure to air it did not oxidize or heat up and, after being exposed to air at room temperature, the oxygen analysis was essentially unchanged.

The powder was fabricated into a metal rod by compacting and extrusion. After annealing for one hour at 1100° C., the size of the metal grains was about 3 microns. The dispersion of rare earth oxide particles was uniform, i.e., there was no evidence of fibering or alignment of particles in the extrusion direction.

In a similar way, these rare earth oxides ($La_2O_3$, $Nd_2O_3$, $Pr_6O_{11}$ and $Sm_2O_3$) can be incorporated into iron or nickel. Such compositions are useful by themselves, or for mixing, by powder metallurgy, these modified metals with unmodified metals including Fe, Co, Ni, Cu, Mo, and W.

*Example 4*

This example is similar to Example 2, except that ten times as much $ThO_2$ was used, thus producing a nickel powder containing 10 volume percent $ThO_2$. In this case, the final stages of the reduction and sintering were carried out at 950° C.

The nickel-thoria powder so produced is an example of a preferred product of the invention. It is an aggregate structure consisting of porous metal particles about 100 microns in size. These particles are a non-dusting, non-pyrophoric powder, suitable for use in powder-metallurgical applications. The aggregate structure consists of a plurality of discrete, colloidal thoria particles entrapped or dispersed in a network of nickel metal. Because of the presence of the thoria in this aggregate, the grains in the nickel are extremely small, of the order of 1 micron, or even smaller.

The powder had a surface area of 2.4 m.$^2$/g., and an oxygen analysis, exclusive of the thoria, of 0.5%.

The powder was used to prepare a metal product by extrusion of a three-fourth-inch billet to one-fourth-inch at about 2200° F. extrusion temperature. This metal rod had a Rockwell A hardness of 66. After annealing for one hour at 1200° C. in vacuum, the hardness was unchanged.

The 100-hour stress-rupture life of a test specimen made from this rod was 7,000 p.s.i. at 1800° F. It had a yield strength at 0.2% offset of 16,000 p.s.i. at 1800° F., whereas control nickel with no thoria had a yield strength of 1,300 p.s.i. at 1800° F. Elongation of the nickel-thoria sample was 3% and for the control, 14%. The percent elongation of the nickel-thoria was thus about 20% of that for nickel without thoria.

*Example 5*

This example is similar to Example 2, except that a product of 2 volume percent thoria in nickel was produced.

The resulting product was a pulverulent powder. This powder consisted of a matrix of nickel particles having a size in the range of 100 to 200 microns through which a plurality of 50 millimicron $ThO_2$ particles were uniformly dispersed. The powder had a surface area of $1$ m.$^2$/g., and a bulk density of 1.9 g./cc.

This powder was pressed to a billet having a density of 4.8 g./ml. The billet was sintered in hydrogen. The temperature during sintering was raised over a period of twelve hours to 1200° C. Temperature was held for six hours.

In addition to fine grain size, absence of fibering, retention of hardness on anneal, high tensile and yield strength (about eight-fold improvement over control nickel at both 1500° and 1800° F.), the wrought product was characterized by improved oxidation resistance.

Specifically the oxidation rate, as measure by weight gain per unit surface area on heating in air at 2200° F. is about equivalent to the rate of oxidation of unmodified nickel at 1500° F. In fact, the oxidation rate of the nickel-thoria is about equal to the oxidation rate of wrought Nichrome (80 Ni-20 Cr).

*Example 6*

This example describes an iron-nickel composition containing 5% thoria by volume dispersed therein, the thoria initially being in the form of colloidal particles 5 to 10 millimicrons in size.

The reactor used to prepare the deposit of iron-nickel hydrous oxycarbonate on the colloidal oxide filler consisted of a stainless-steel tank with a conical bottom. The bottom of the tank was attached to stainless-steel piping, to which were attached three inlet pipes through T's, this circulating line then passed through a centrifugal pump of 20 g.p.m. capacity, and from the pump the line was returned to the tank. Initially, the tank was charged with 2 gallons of water. Equal volumes of three solutions containing the desired quantities of reagents were then added into the middle of the flowing stream through one-eighth-inch diameter tubing attached to the T tubes. These solutions were added at uniform equivalent rates over a period of about one-half hour. Through the first T was added a solution of iron nitrate-nickel nitrate prepared by dissolving 2190 grams $Fe(NO_3)_3.9H_2O$ and 169 grams $Ni(NO_3)_2.6H_2O$ in water and diluting to 3.7 liters. Through the second T was added 3.7 liters of 3.5 molar $(NH_4)_2CO_3$ and through the third 3.7 liters of thoria sol made by diluting 60 grams of 36% $ThO_2$ aquasol with water. The thoria aquasol was highly fluid and contained 5 to 10 millicron particles.

The solutions were added into the reactor simultaneously while the pump was in operation. The rate of addition was controlled uniformly by flow meters. The pH of the solution in the tank was taken at frequent time intervals to insure proper operating, the final pH being 7.7. The slurry was circulated for a few minutes after the addition of the reagents had been completed, and then the solution was pumped into a filter. The precipitate was filtered and washed with water, and dried at a temperature of about 300° C. for twenty-four hours.

This product was then pulverized by grinding in a hammermill, and screened to pass 325 mesh.

The product was then placed in a furnace at a temperature of about 100° C., and a mixture of argon and hydrogen was slowly passed over the dried powder. This gas stream was carefully freed of oxygen and dried. The temperature in the furnace was slowly raised over a period of an hour. The flow of hydrogen was then gradually increased and the temperature in the furnace also, until a temperature of 600° C. was reached, whereupon a large excess of hydrogen was passed over the sample in order to complete the reduction. Finally, the temperature was raised to 980° C., while continuing to pass hydrogen over the sample. In this way, an iron-nickel powder containing 5 volume percent thoria was produced. This powder had a surface area less than 1 m.$^2$/g.

The powder was cooled to room temperature before air was admitted into the reduction chamber. The powder consisted of a plurality of 70 millimicron thoria particles dispersed uniformly in a nickel-iron matrix. These powder particles were pulverulent; they were about 100 microns in size. Thoria has a melting point greater than 2800° C. and a free energy of formation at 1000° C. of 119 kcal. per gram atom of oxygen.

The oxygen analysis of this powder, exclusive of the thoria was less than 0.01%. The powder was not pyrophoric.

The bulk density of the powder was 2.5 g./cc. The grain size of the metal averaged in the less-than-2-micron range. This grain size did not change even after anneal at 1100° C.

*Example 7*

This example describes a cobalt-nickel composition modified with 2.5 volume percent thoria, said composition being useful in preparing an improved high temperature alloy.

The preparation followed the general details as outlined in Example 6, except for the following: The feed solutions consisted of: (a) 1125 grams $Co(NO_3)_2.6H_2O$ and 2470 grams $Ni(NO_3)_2.6H_2O$ in 5 liters $H_2O$, (b) 57.4 grams $ThO_2$ sol containing 36.4% solids diluted to 5 liters, and (c) 1900 grams $(NH_3)_2CO_3$ dissolved in $H_2O$ and diluted to 5 liters. Reduction was carried out at 500 to 600° C. and sintering in hydrogen for one-half hour at 850° C.

This powder (−325 mesh) of modified nickel-cobalt was then useful for blending with other metal powders. The powder consisted of a matrix of cobalt-nickel alloy through which 100 millimicron thoria particles were uniformly dispersed. The powder had a surface area of 1.8 m.$^2$/g. The oxygen content of the powder, exclusive of the thoria, was 0.1%. The powder was not pyrophoric. When exposed to air at room temperature, its oxygen content remained essentially unchanged.

*Example 8*

A modified iron, molybdenum, nickel alloy was prepared directly, as follows: Feed solutions of (a) 3220 grams of $Ni(NO_3)_2.6H_2O$ and 322 grams $Fe(NO_3)_3.9H_2O$ in 5 liters of solution, (b) 1980 grams $ThO_2$ colloid (6.11% solids in the form of 5 to 10 millimicron particles) diluted to 5 liters and (c) 4 liters of 5 molar NaOH were added simultaneously, and separately, to a heel of 5 liters of solution containing 757 grams of $Na_2MoO_4.2H_2O$. The pH of the final slurry was 10.

The precipitate was washed repeatedly until the sodium content was below 0.1% on the solids, and then the material was dried, and reduced at 700° C. and sintered at 1300° C. in pure, dry hydrogen until the oxygen content of the reduced metal, exclusive of $ThO_2$, was less than 0.1%. The resulting metal powder containing 10 volume percent $ThO_2$ filler, in the form of colloidal sized particles, was useful for preparing improved nickel, molybdenum, iron alloys.

The powder had a surface area of 1 m.$^2$/g., a bulk density of 2.3 g./cc. and contained 0.4% oxygen in excess of that present in the oxide filler.

The metal grains in the powder were less than 2 microns in size. This grain size did not change on annealing at 1100° C.

*Example 9*

A sample of 10 volume percent thoria in an 85% nickel-15% molybdenum alloy was prepared as follows: To a heel of 5 liters of solution containing 303 grams of $Na_2MoO_4.2H_2O$ were added: (a) 5 liters of solution containing 3370 grams $Ni(NO_3)_2.6H_2O$, (b) 5 liters of thoria aquasol (containing 98 grams $ThO_2$ as 10 millimicron particles), and (c) 4.15 liters of 20% NaOH. The final pH was 7.4.

The precipitate was washed, dried, and reduced as in Example 8.

*Example 10*

Using a colloid of mixed rare earth oxides (prepared from didymium chloride) and $Fe(NO_3)_3$, a preparation of 3 volume percent of these oxides in iron was prepared. When this material was extruded into one-fourth-inch rods, as in earlier examples, a modified iron having a yield strength of 11,000 p.s.i. at 1500° F. was obtained. Metallurgical examination of the extruded part showed that the rare earth oxide was very uniformly dispersed as a colloid throughout the iron. The particle size of the filler in the final iron product was in the range of about 55 millimicrons.

*Example 11*

This example describes a product of the invention in which a fibrous filler, alumina, is used to reinforce the properties of iron.

The fibrous alumina was prepared by autoclaving a dilute aqueous solution of chlorohydrol, $Al(OH)_5Cl$, at 140° C. The fibrous alumina colloid so prepared had a surface area of 248 m.$^2$/g., and contained about 2% solids.

To a colloidal solution containing 1.8 grams $Al_2O_3$, two additional solutions were added, containing (a) 120 grams $Fe(NO_3)_3.9H_2O$ and (b) 36 grams NaOH. As a result a precipitate of $Fe(OH)_3$ was formed in which colloidal fibers of alumina were embedded.

This precipitate was washed by centrifuging the precipitate and reslurrying it in water several times. The resulting cake was dried and ground to pass 150 mesh.

The powder was subjected to a stream of hydrogen, while the temperature was slowly raised to 979° C. The resulting sintered iron powder contained 20 volume percent $Al_2O_3$. This powder was then compacted to a dense mass of metal. The metal grains in the compact were less than 1 micron in size.

*Example 12*

A sample of Ni-36% $Al_2O_3$ by volume was prepared from the following solutions: (a) 3053 grams $$Ni(NO_3)_2.6H_2O$$

dissolved in water and diluted to 5 liters with distilled water, (b) 1589 grams of 8.9% alumina sol containing 25 millimicron discrete, spherical alumina particles diluted to 5 liters with distilled water, and (c) 4.5 liters of 25% $(NH_3)_2CO_3$ solution. These solutions were added to 5 liters distilled $H_2O$ over a period of forty-two minutes, during which the pH was maintained at 7.4 to 7.0. At completion of the purification, the cake was washed four times with 3-liter portions of distilled water. This wet cake was dried overnight at 240° C., yielding 978 grams. This dried cake was then heated for two hours at 450°

C., yielding 813 grams product which was micropulverized —100 mesh.

The micropulverized material prepared above was reduced at 1100° C. for nineteen hours. The dew point of the effluent hydrogen was —50° C. The yield was 504 grams of product. This corresponds to an over-all yield of 82.8% based on 10 moles Ni, 142 grams $Al_2O_3$.

*Example 13*

Using the procedure of Example 2, and substituting a rare earth oxide aquasol for the $ThO_2$ aquasol, a pulverulent metal powder containing 2 volume percent rare earth oxide in nickel was produced.

The powder had a surface area of 0.9 m.²/g. and a bulk density of 1.77 grams/ml. When cold pressed at 30 t.s.i., a green billet of 5 g./ml. was produced. This green billet was sintered in vacuum at 1200° C., and extruded at a reduction in area of 16:1.

This extruded rod had a yield strength at 1800° F. of 10,000 p.s.i. and an elongation of 25%. All the nickel grains in the product were less than 10 microns in size, even after annealing at 1100° C.

*Example 14*

This example describes a nickel-alumina powder prepared from 100 millimicron $Al_2O_3$ particles.

The apparatus used in preparing the gamma alumina aquasol consisted of a burner having a small central orifice, an annular opening surrounding the central orifice, and a series of small holes in a ring surrounding the other openings. These outer holes were connected to a supply of oxygen and illuminating gas and angled such that a cone of flames could project beyond the central openings. The annular opening was connected to a source of dry nitrogen which was used as a gas shield to protect the gases issuing from the central orifice from the reaction products of the flame, until those gases had moved significantly beyond the end of the burner and into the flame zone. The central orifice was connected to a container holding anhydrous aluminum chloride and through which was passed dry nitrogen as a carrier gas. The aluminum chloride container was heated in a vertical tube furnace while all other tubes, including the burner nozzle, were heated in a horizontal tube furnace. Thus, the aluminum chloride was maintained at 190 to 210° C. to maintain a flow of 30 to 50 grams per hour of aluminum chloride and the tubes carrying this gas to the nozzle were heated to about 250° C. to prevent any condensation of the chloride.

Since the hydrolysis reaction is extremely rapid, the nitrogen shield was insufficient to prevent build-up of alumina at the burner nozzle. Consequently, an oscillating spatula was employed to sweep the alumina build-up off the orifice. To increase the contact time of the alumina in the flame, a 21 cm. glass tube (31 mm. inside diameter) was placed just beyond the nozzle and coaxial with it to increase the length of the flame. The alumina particles were collected directly in water by impinging the flame on a rotating glass cylinder cooled internally with flowing water and wet on the surface by partially submerging it in a glass tray containing water. The colloidal particles, therefore, collected in the water in the tray.

The maximum flame temperature was assumed to be 1800 to 1900° C. and the total contact time in the flame was 0.02 to 0.05 second. Oxygen and illuminating gas were each used at a rate of 3.3 liters per minute. Shielding nitrogen was used at a rate of 250 ml. per minute, and nitrogen was passed through the aluminum chloride at 300 ml. per minute.

The alumina slurry collected in the glass tray also contained a considerable concentration of hydrochloric acid causing the alumina to coagulate and settle out. Thus, most of the acid was removable by decantation. On diluting with water, the alumina peptized.

The specific surface area of the dried product was 12 m.²/g.; this corresponds to $Al_2O_3$ particles which are about 120 millimicrons in diameter. An electron micrograph of the particles shows that they are discrete spheres.

Using an aquasol prepared in this manner as the source of filler, a nickel-30 volume percent alumina was prepared. The procedure was similar to that of Example 4, substituting the alumina sol for the thoria.

*Example 15*

A nickel-30% copper alloy, containing 2 volume percent thoria was prepared, following the technique of Example 2, using as feed solutions: (a) 5 liters of metal nitrate containing 1740 grams $Ni(NO_3)_2.6H_2O$ and 561 grams $Cu(NO_3)_2.3H_2O$, (b) 5 liters of saturated $(NH_4)_2CO_3$ solution, and (c) 5 liters of thoria sol containing 2.8% solids.

*Example 16*

A nickel-zirconia powder, containing 3 volume percent zirconia was prepared using the precipitation technique of Example 2. The zirconia aquasol used for this latter preparation contained $ZrO_2$ particles which were about 10 millimicrons in diameter. The zirconia sol at 10% solids had a relative viscosity vs. water of 1.4. It was prepared by autoclaving 1 molar $ZrO(NO_3)_2$ solution at 200° C. and peptizing the resultant precipitate in distilled water. The nickel oxide zirconia composition was reduced at 650° C. The powder was then sintered at 850° C.

*Example 17*

A Co-Ni-W powder containing 6% thoria was prepared as follows: A reactor similar to that of Example 2 was used. The reactor was initially charged with 2 gallons of water. Five liters of each of four feed solutions were then added as follows: (a) 2040 grams $Co(NO_3)_2.2H_2O$ and 373 grams $Ni(NO_3)_2.6H_2O$ in 5 liters $H_2O$, (b) 165 grams $(NH_4)_6W_7O_{24}.4H_2O$ dissolved in water and diluted to 5 liters, (c) 640 grams of thoria aquasol, containing 6.3% solids and having 5 to 10 millimicron colloidal $ThO_2$ particles, diluted to 5 liters, and (d) 4 liters of 30% $(NH_4)_2CO_3$ solution diluted to 5 liters.

These solutions were added simultaneously while the pump was in operation. The rate of addition was controlled by flow meters and the influent streams were introduced into a zone of extreme turbulence. The precipitate formed was filtered, washed, dried and pulverized to —325 mesh.

The product was then reduced with hydrogen as in Example 2. The final reduction temperature was 1075° C. The resulting $ThO_2$-containing metal powder was found by analysis to contain 0.02% oxygen in excess of that present as thoria.

This application is a continuation in part of our co-pending application U.S. Serial No. 694,086, filed November 4, 1957, now Patent No. 3,019,103, as a continuation in part of our then co-pending application U.S. Serial No. 657,507, filed May 7, 1957, and now abandoned.

We claim:

1. A sintered composition consisting essentially of a metallic component selected from the group consisting of iron, cobalt, and nickel, and alloys of these metals with each other and with other metals having an oxide stable up to 300° C., said oxide having a free energy of formation at 27° C. of from 30 to 70 kcal. per gram atom of oxygen, the metallic component having uniformly dispersed therein from 0.5 to 50% by volume of filler particles having an average dimension of 5 to 1000 millimicrons, said filler being a refractory metal oxide having a free energy of formation at 1000° C. above 60 kilocalories per gram atom of oxygen and having a melting point above 1000° C., the composition having a surface area less than 10 square meters per gram and the average size of the grains of the metal being less than 10 microns.

2. A composition of claim 1 in which the filler oxide has a free energy of formation at 1000° C. above 110 kilocalories per gram atom of oxygen and is present in the proportion of from 0.5 to 30% by volume.

3. A composition of claim 1 in powder form, in which the volume loading of refractory oxide filler is from 0.5 to 30% and the ozygen content, exclusive of the oxygen in the filler, is in the range from 0 to 2% by weight.

4. A solid, sintered, compacted and worked metal composition of claim 1 in which the apparent density is from 99 to 100% of the absolute density and the filler oxide is present in the proportion of from 0.5 to 30% by volume, the composition being substantially free of fibering of the dispersed filler and having an oxygen content, exclusive of the oxygen in the filler, in the range of from 0 to 2% by weight.

5. A composition of claim 4 in which the metal is an alloy having as its major metal component a metal selected from the group consisting of iron, cobalt, and nickel and the filler oxide is present in the proportion of from 0.5 to 30% by volume.

6. A composition of claim 4 in which the refractory oxide filler particles have an average size in the range of from 10 to 250 millimicrons and are present in the proportion of from 0.5 to 30% by volume and the oxygen content of the composition, exclusive of the oxygen in the filler, is in the range of from 0 to 0.1% by weight.

7. A composition in powder form consisting essentially of a matrix metal selected from the group consisting of iron, cobalt and nickel and alloys of these metals with each other and with other metals having an oxide stable up to 300° C., said oxide having a free energy of formation at 27° C. of from 30 to 70 kcal. per gram atom of oxygen, said matrix metal having uniformly embedded therein a plurality of discrete, metal oxide filler particles having an average size of 5 to 1000 millimicrons, said filler particles being substantially completely surrounded by a coating of said matrix metal which maintains them separate and distinct the filler metal oxide having a free energy of formation at 1000° C. above 60 kcal. per gram atom of oxygen and having a melting point above 1000° C., the volume loading of the filler particles being in the range from 0.5 to 50%, the average size of the matrix metal grains being less than 10 microns, and the composition having an average powder particle size greater than 10 microns and a surface area less than 10 square meters per gram whereby said powder is stable in air against oxidation of the order of pyrophoricity.

8. A composition of claim 7 in which the metal oxide filler particles have an average size in the range from 10 to 250 millimicrons and the volume loading of filler is in the range from 0.5 to 30%.

9. A composition of claim 8 in which the oxygen content, exclusive of the oxygen in the filler, is in the range from 0 to 2% by weight.

10. A composition of claim 9 in which nickel is the major metallic component.

11. A composition of claim 9 in which cobalt is the major metallic component.

References Cited in the file of this patent
UNITED STATES PATENTS

| | | |
|---|---|---|
| 2,580,171 | Hagglund | Dec. 25, 1951 |
| 2,823,988 | Grant et al. | Feb. 18, 1958 |
| 2,852,367 | Goetzel et al. | Sept. 16, 1958 |

FOREIGN PATENTS

| | | |
|---|---|---|
| 580,744 | Great Britain | Sept. 18, 1946 |